US012639491B2

(12) United States Patent
Wigny et al.

(10) Patent No.: US 12,639,491 B2
(45) Date of Patent: May 26, 2026

(54) METHODS AND SYSTEMS FOR ASSESSING COMPLIANCE OF AIRCRAFT ENGINES

(71) Applicant: PRATT & WHITNEY CANADA CORP., Longueuil (CA)

(72) Inventors: Robert Wigny, Bolton (CA); Avisekh Banerjee, Oakville (CA); Hongyu Zhu, West Hartford, CT (US); Andrea De Antoni, Rome (IT); Amit Surana, Newington, CT (US)

(73) Assignee: PRATT & WHITNEY CANADA CORP., Longueuil (CA)

( * ) Notice: Subject to any disclaimer, the term of this patent is extended or adjusted under 35 U.S.C. 154(b) by 1072 days.

(21) Appl. No.: 17/205,335

(22) Filed: Mar. 18, 2021

(65) Prior Publication Data

US 2022/0300682 A1      Sep. 22, 2022

(51) Int. Cl.
  *G06F 30/27*      (2020.01)
  *B64F 5/60*      (2017.01)
  (Continued)

(52) U.S. Cl.
  CPC ................ *G06F 30/27* (2020.01); *B64F 5/60* (2017.01); *G06F 18/2193* (2023.01);
  (Continued)

(58) Field of Classification Search
  CPC ...... G06F 30/27; G06F 18/2193; G06F 18/22; G06F 2111/08; G06F 2119/20; B64F 5/60
  See application file for complete search history.

(56) References Cited

U.S. PATENT DOCUMENTS 6,351,721 B1    2/2002  Werner et al.
8,868,284 B2   10/2014  Isom et al.
       (Continued)

FOREIGN PATENT DOCUMENTS

EP      2521083 A1    11/2012
EP      2762852 A1     8/2014

OTHER PUBLICATIONS

Yildirim et al. Aircraft Gas Turbine Engine Health Monitoring System by Real Flight Data Department of Aircraft Electrical and Electronics, Ecriyes University, Turkey, published Mar. 14, 2018 (Year: 2018).*

(Continued)

*Primary Examiner* — Rehana Perveen
*Assistant Examiner* — Cuong V Luu
(74) *Attorney, Agent, or Firm* — Norton Rose Fulbright Canada LLP

(57) ABSTRACT

Methods and systems for assessing compliance of aircraft engines are described. The method comprises selecting a test population from a set of deployed aircraft engines based on one or more selection criteria, each of the deployed aircraft engines having associated thereto design requirements and field data; selecting at least one parameter that is present in both the design requirements and the field data of the test population, the design requirements comprising design time-series profiles, the field data comprising field time-series profiles; comparing the field time-series profiles to the design time-series profiles for the at least one parameter using a similarity metric to obtain field statistics; comparing the field statistics to expected statistics from the design requirements; and generating a compliance assessment output of the test population based on a difference between the field statistics and the expected statistics.

17 Claims, 10 Drawing Sheets

(51) Int. Cl.
| | |
|---|---|
| *G06F 18/21* | (2023.01) |
| *G06F 18/22* | (2023.01) |
| *G06F 111/08* | (2020.01) |
| *G06F 119/20* | (2020.01) |

(52) U.S. Cl.
CPC .......... *G06F 18/22* (2023.01); *G06F 2111/08* (2020.01); *G06F 2119/20* (2020.01)

(56)     References Cited

U.S. PATENT DOCUMENTS

| | | | |
|---|---|---|---|
| 10,528,923 B2 | 1/2020 | Pinsonnault et al. | |
| 10,726,171 B2 | 7/2020 | Sheldon et al. | |
| 2015/0362405 A1* | 12/2015 | Bowler ................. | G01M 15/14 |
| | | | 415/118 |
| 2017/0017736 A1 | 1/2017 | Beale et al. | |
| 2018/0034185 A1 | 2/2018 | Nagasaka et al. | |
| 2018/0268090 A1* | 9/2018 | Ren .................... | G05B 23/0297 |
| 2022/0027529 A1* | 1/2022 | Zarur ...................... | G06F 30/12 |

OTHER PUBLICATIONS

European Patent Office, Communication re. extended European search report for European patent application No. 22163086, Jul. 22, 2022.

Federal Register, Rules and Regulations, vol. 77, No. 250, Dec. 31, 2012, https://www.govinfo.gov/content/pkg/FR-2012-12-31/pdf/2012-31109.pdf, accessed on Jul. 13, 2022, pp. 76842-76854.

* cited by examiner

Mission 1: DM = 0.35

Mission 2: DM = 0.68

METHODS AND SYSTEMS FOR ASSESSING COMPLIANCE OF AIRCRAFT ENGINES

TECHNICAL FIELD

The present disclosure relates generally to aircraft engines and, more particularly, to a compliance analysis tool for aircraft engines.

BACKGROUND OF THE ART

When an engine is designed, there are assumptions made as to its planned utilisation. Design requirements are set at the beginning of a new product development phase and serve to guide product design/production and maintenance planning. The design requirements are based on expected environmental factors, such as temperature, altitude or vibration, as well as expected performance parameters such as thrust and fuel consumption of the aircraft engine during operation. Once deployed, the actual utilisation of the aircraft engine may vary from the expected utilisation.

While existing tools for validating compliance of field data with design assumptions are suitable for their purposes, there is room for improvement.

SUMMARY

In one aspect, there is provided a method for assessing compliance of aircraft engines. The method comprises selecting a test population from a set of deployed aircraft engines based on one or more selection criteria, each of the deployed aircraft engines having associated thereto design requirements and field data; selecting at least one parameter that is present in both the design requirements and the field data of the test population, the design requirements comprising design time-series profiles, the field data comprising field time-series profiles; comparing the field time-series profiles to the design time-series profiles for the at least one parameter using a similarity metric to obtain field statistics; comparing the field statistics to expected statistics from the design requirements; and generating a compliance assessment output of the test population based on a difference between the field statistics and the expected statistics.

In another aspect, there is provided a system for system for assessing compliance of aircraft engines. The system comprises at least one processor and a non-transitory computer-readable medium having stored therein program instructions. The program instructions are executable by the at least one processor for selecting a test population from a set of deployed aircraft engines based on one or more selection criteria, each of the deployed aircraft engines having associated thereto design requirements and field data; selecting at least one parameter that is present in both the design requirements and the field data of the test population, the design requirements comprising design time-series profiles, the field data comprising field time-series profiles; comparing the field time-series profiles to the design time-series profiles for the at least one parameter using a similarity metric to obtain field statistics; comparing the field statistics to expected statistics from the design requirements; and generating a compliance assessment output of the test population based on a difference between the field statistics and the expected statistics.

The embodiments described herein may be used together, in any combination.

DESCRIPTION OF THE DRAWINGS

Reference is now made to the accompanying figures in which.

DETAILED DESCRIPTION

The present disclosure relates to methods and system for assessing compliance of aircraft engines. A similarity assessment is performed between actual field data of deployed aircraft engines and expected requirements as assumed during the design phase. A deviation in actual vs expected may have an impact on maintenance and/or warranties associated with the engine. A comparison of actual vs expected can be done manually, but this is a very time consuming process that is further complicated by the nature of the data for aircraft engines, which requires temporal ordering and/or sequencing of behavior in order to properly represent the events of a flight (referred to herein as a mission). Therefore, compliance assessment for aircraft engines differs from compliance assessment for other types of static components, such as aircraft components that have a static structure and can therefore be compared more easily. Accordingly, the compliance analysis described herein accounts for the sequence, duration, and amplitude of operational parameters that change over time through time-series data that represent design requirements and field data. Time-series profiles are used to define the various flight phases of an aircraft mission and identify when different events and environments occur throughout the mission.

Figure 1:
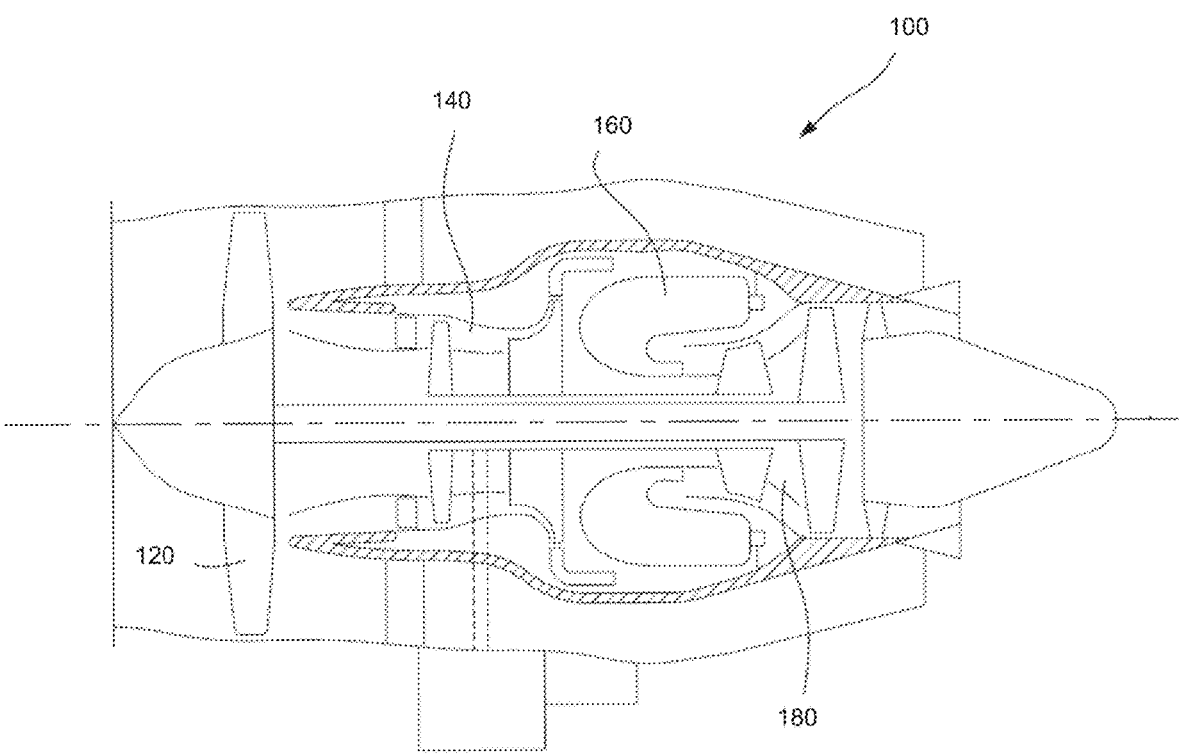
FIG. 1 is a schematic cross sectional view of an example gas turbine engine.

The methods and systems for assessing compliance as described herein are applicable to gas turbine engines such as turbofan engines, turboshaft engines, and turboprop engines. FIG. 1 illustrates an example gas turbine engine 100 of a type provided for use in subsonic flight, generally comprising in serial flow communication a fan 120 through which ambient air is propelled, a compressor section 140 for pressurizing the air, a combustor 160 in which the compressed air is mixed with fuel and ignited for generating an annular stream of hot combustion gases, and a turbine section 180 for extracting energy from the combustion gases. It will be understood that the engine 100 of FIG. 1 is merely one example of a type of engine for which the methods and systems for assessing compliance may be used, as they may also be suitable for other fuel-based engines, diesel engines, electric engines, hybrid electric engines, etc.

Figure 2:
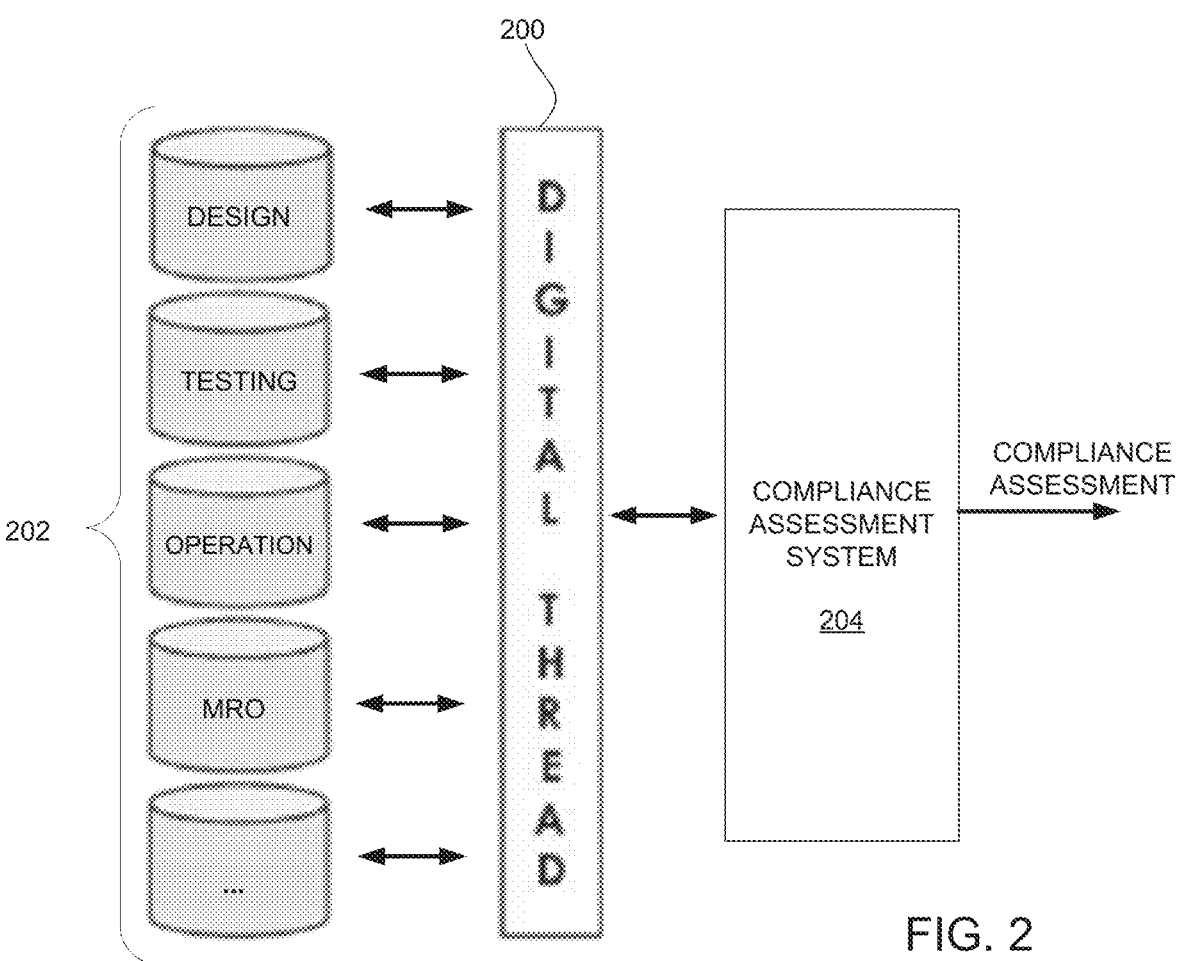
FIG. 2 is schematic diagram of a compliance analysis system coupled to a digital thread platform.

The methods and systems for compliance assessment make use of a digital thread platform. The expression "digital thread" is used herein to refer to a collection of digital data across the life cycle of existing engines, including design, testing, manufacturing, operation, maintenance, and end of life. The platform provides access to the digital footprint of engines that have been manufactured and deployed. Referring to FIG. 2, a digital thread platform 200 provides access to one or more databases 202 holding data for deployed engines. Although the expression "database" is used herein, any type of repository for holding data or information that is organized for search and retrieval may be used. The databases 202 comprise digital data relating to one or more of the design, testing, operation, maintenance and repair (MRO), and any other aspect of the life cycle of deployed engines. For example, the digital data may also relate to flights, operating conditions, usage, and analytical data for the deployed engines. The databases 202 are illustrated as separate entities but may be grouped in any manner or combination. In addition, the databases 202 may be located at various remote locations, accessible through the digital thread platform 200 via one or more network. A compliance assessment system 204 is operatively coupled to the digital thread platform 200 for access and retrieval of data from the databases 202.

In some embodiments the digital thread platform 200 makes use of a Knowledge Graph (KG) to link the data found in the databases 202 and provide a framework for data integration, unification, analytics, and sharing. A semantic definition is captured into a computational ontology with respect to main engine features and properties. Access to the KG is provided via reasoning, including classification, entailment, link embedding, graph matching, and the like. Alternatively, other structures and/or tools may be used for data representation and knowledge management. For example, property graphs, labelled graphs, object-oriented models, NoSQL stores, associative or relational databases, and a combination thereof may be used.

Figure 3:
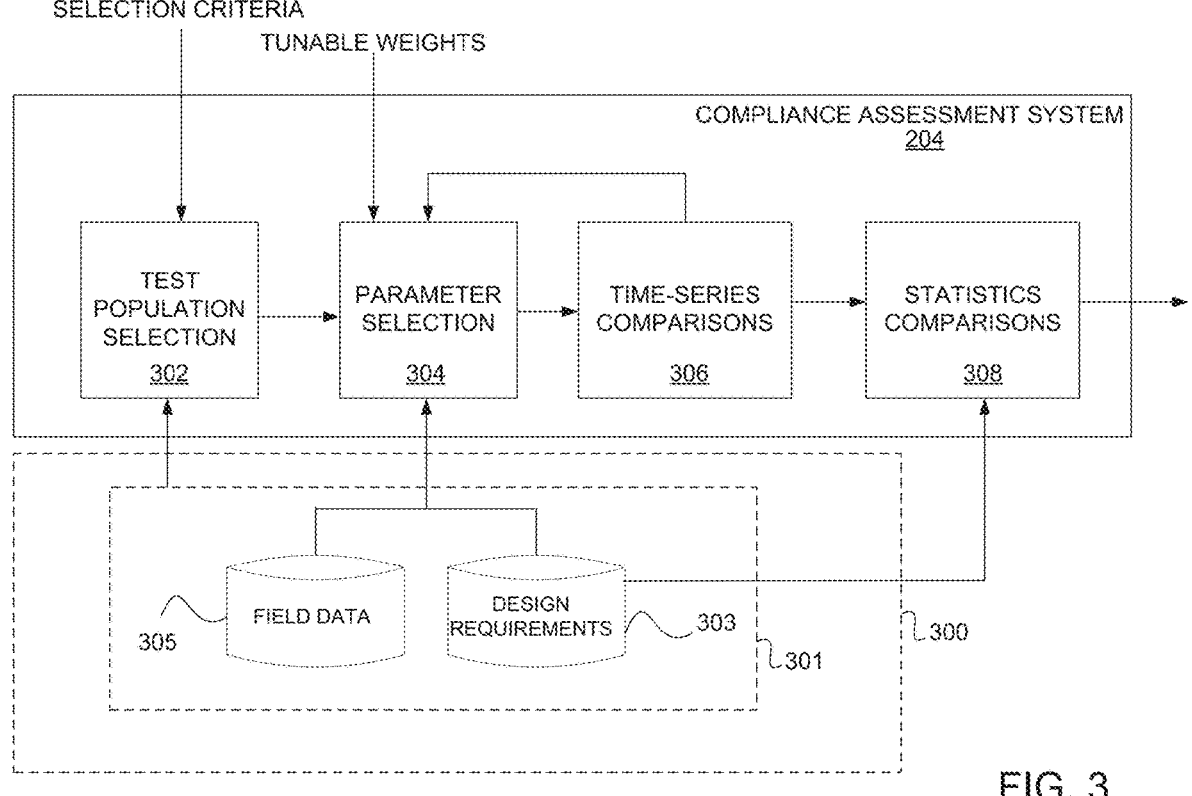
FIG. 3 is a block diagram of an example embodiment of the compliance analysis system of FIG. 2.

With reference to FIG. 3, there is illustrated an example embodiment of the compliance assessment system 204. Various functions performed by the compliance assessment system 204 are represented visually as separate blocks with incoming and outgoing dataflow. It will be understood that this representation of the compliance assessment system 204 is illustrative only and the various functions may be arranged and/or grouped differently, using a combination of software and hardware tools. At 302, one or more selection criteria is used to select a test population 301 from a set of deployed engines 300. For example, the selection criteria may be an engine model, an aircraft model, a time period, a geographic location, an aircraft operator, and/or an aircraft fleet. Other selection criteria may also be used. At 304, at least one parameter that is present in both the design requirements 303 and the field data 305 of the test population 301 is selected for the compliance assessment. The parameter may be engine related, such as an engine rating, engine temperature, engine pressure, etc., or aircraft related, such as altitude, Mach number, outside temperature, outside pressure, etc. In some embodiments, the parameter is normalized, for example by taking its average or using a maximum or minimum value. In some embodiments, weights are assigned to the parameters of the test population so as to weigh the parameters differently for the compliance assessment. The weights may be tunable, as will be explained in more detail below.

The one or more parameter selected for compliance assessment comprises a time series profile in order to account for the sequence of events that occur during a mission and the flight phase in which the events occur. Indeed, a change in engine pressure that occurs during take-off may have different implications than a change in engine pressure that occurs during cruise. Furthermore, the engine may be designed for the change in engine pressure at take-off but the change in engine pressure at cruise may be an anomaly. The examples used herein illustrate a compliance analysis for engine utilisation to validate actual utilisation compared to expected utilisation, as defined by design requirements, which may comprise design missions and each design missions utilisation percentage. As engines are typically used for more than one specific application, an engine is designed using a set of design mission profiles that together represent the expected use of the engine. Field mission profiles are generated using field data and compared to the design mission profiles using a similarity metric.

Figure 4A:
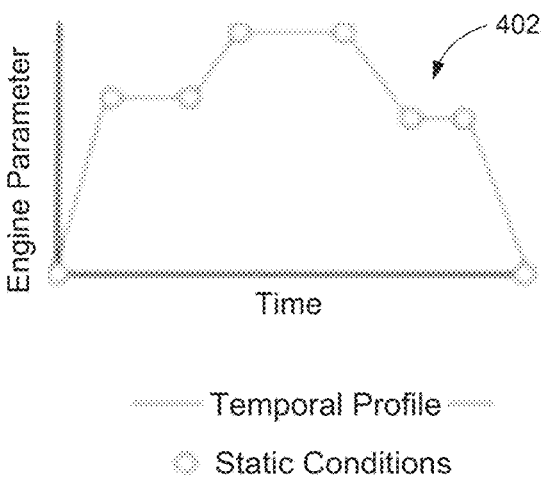
FIGS. 4A-4B are examples of individual time-series profiles.
Figure 4B:
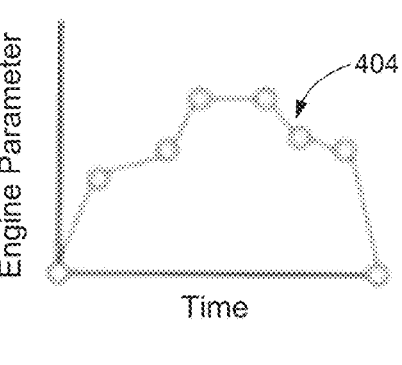

Examples of time-series mission profiles are illustrated in FIGS. 4A-4B. FIG. 4A represents a time series profile 402 of a given design mission (i.e. a design mission profile) for a given engine parameter over time. Each selected parameter may have a design mission profile associated thereto. Alternatively, a design mission profile may represent a plurality of parameters. The design mission is created at the time of engine design. In some embodiments, the design mission may evolve with time. For example, engine design/production may take several years and during this time, an operator may provide updated and/or revised requirements regarding the intended use of the engine being developed. These changes over time to the design mission may be tracked through the digital thread platform 200. The intended use of the engine may be captured by more than one design mission, with a statistical breakdown setting out the expected utilisation for each design mission. For example, a given test population may have design mission 1 with an expected use of 70% and design mission 2 with an expected use of 30%. These values are exemplary only and may vary depending on engine design.

FIG. 4B represents a time-series profile 404 of a given field mission for the same engine parameter over time. The data points in the time-series profile 404 of the field mission (i.e. field mission profiles) may be recorded inflight, for each mission. Therefore, the test population may have one field mission profile per parameter considered for the compliance assessment. Alternatively, each field mission profile may represent a plurality of parameters. The field mission profiles and design mission profiles are provided to 306 (see FIG. 3), with or without weights, for a time-series comparison using a similarity metric to obtain field statistics that represent the field data. For example, if there were two design missions, the field statistics may indicate how many of the field missions correspond to design mission 1 and how many correspond to design mission 2. The time-series comparison may therefore be viewed as a grouping of the field mission profiles into pre-defined categories that correspond to the design mission profiles, using the similarity metric.

Figure 5A:
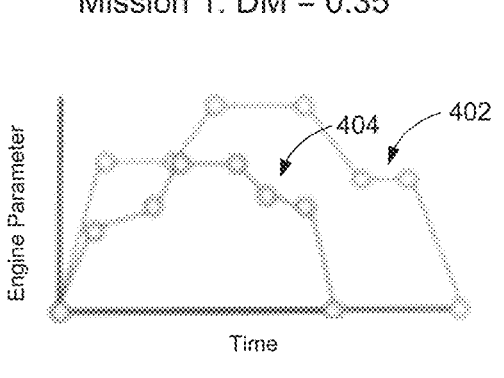
FIGS. 5A-5B are examples of comparisons of pairs of time-series profiles.
Figure 5B:
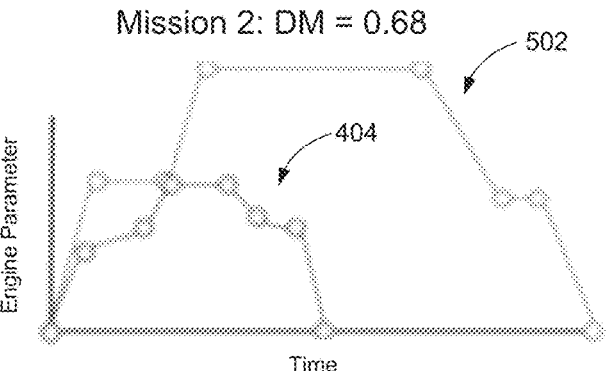
Figure 6:
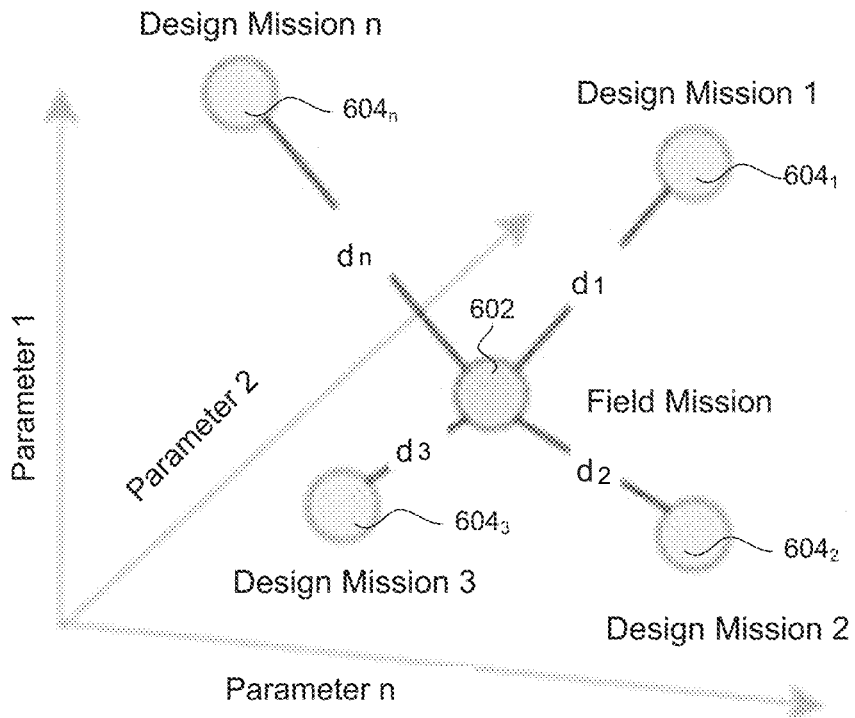
FIG. 6 is an example of a time-series profile comparison using a distance metric.

FIGS. 5A-5B illustrate schematically a comparison of two time-series profiles. The similarity metric for the comparison can be, for example, a distance measurement. In some embodiments, the comparison is performed using dynamic time warping. Other methods for comparing time-series profiles, such as value comparison, trend comparison, and distribution comparison, may also be used. In FIG. 5A, the field mission profile 404 is compared to the design mission profile 402 (i.e. Mission 1). In FIG. 5B, the field mission profile 404 is compared to the design mission profile 502 (i.e. Mission 2). The first comparison (FIG. 5A) yields a distance measure (DM) of 0.35 while the second comparison (FIG. 5B) yields a DM of 0.68. Therefore, the field mission profile 404 is closer to design mission profile 402 than it is to design mission profile 502 and is classified as Mission 1. This process may be repeated for all field mission profiles, for all parameters. With reference to FIG. 6, point 602 can represent a plurality of parameter profiles along the temporal profile of a field mission, and points 604₁, 604₂, 604₃, . . . 604ₙ can represent a plurality of parameter profiles along the temporal profile of each design mission (Design Mission 1, Design Mission 2, Design Mission 3, . . . Design Mission n) for selected parameters (Parameter 1, Parameter 2, . . . Parameter n). Dynamic time warping is used to obtain distance measurements $d_1$, $d_2$, $d_3$, . . . $d_n$ in order to determine the best correspondence between static points. The closest distance measurement is used to classify the field mission.

Figures 7A, 7B:
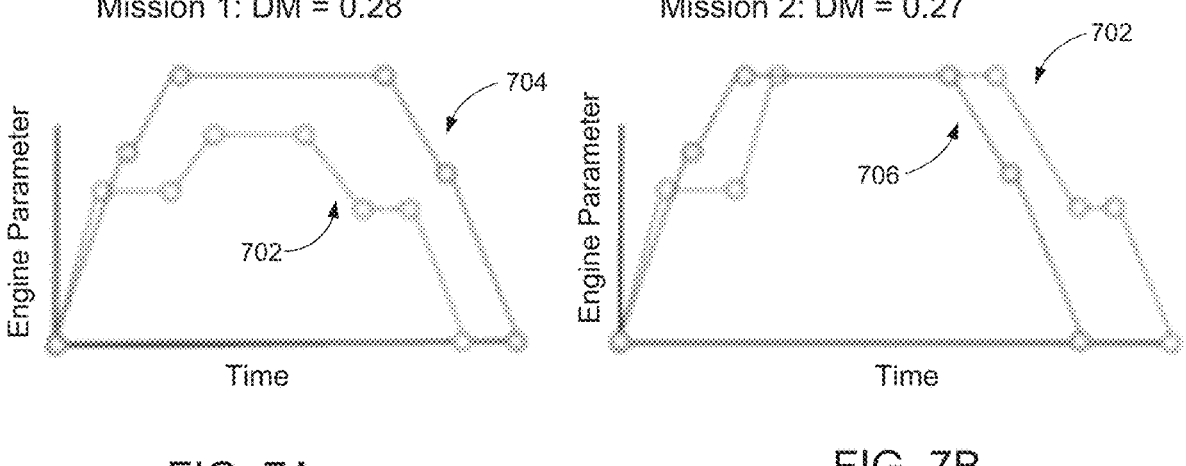
FIGS. 7A-7B are examples of time-series profile comparisons with classification ambiguity.

As indicated above, weights assigned to the parameters may be tunable through minimal user feedback, for example through sample selection active learning. Tuning of the weights can be used to reflect an importance given to different parameters by a user in computing the similarity measure. Weight tuning may also be used, for example, when the outcomes of the comparison between a field mission profile and two design mission profiles are too close to properly classify the field mission profile. An example is shown in FIGS. 7A-7B. FIG. 7A illustrates a comparison between a field mission profile 702 and a design mission profile 704 for Mission 1 that results in a DM of 0.28. FIG. 7B illustrates a comparison between the field mission profile 702 and a design mission profile 706 for Mission 2 that results in a DM of 0.27. Tuning the weights may cause a greater difference between the distance measurements to allow the field mission to more easily be classified. This iterative process is illustrated in FIG. 3, where the compliance assessment system 204 may revert back to the parameter selection at 304 after a time-series comparison at 306. Other embodiments for tuning the parameter weights will be readily understood by those skilled in the art.

Figures 8A, 8B:
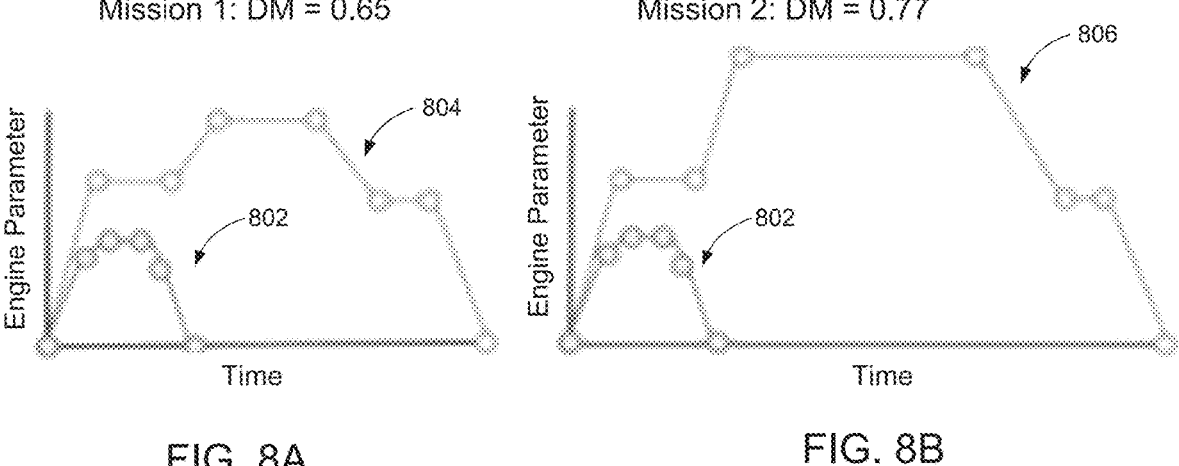
FIGS. 8A-8B are examples of time-series profile comparisons for outlier detection.

In some embodiments, the time-series comparison performed at 306 further comprises detecting outliers from the field missions. Any anomaly detection method may be used to detect the outliers. For example, a distance metric threshold may be set such that any field mission that has a distance from all of the design missions that is greater than the threshold value is considered an outlier. An example is shown at FIGS. 8A-8B. FIG. 8A illustrates a comparison between a field mission profile 802 and a design mission profile 804 for Mission 1 that results in a DM of 0.65. FIG. 8B illustrates a comparison between the field mission profile 802 and a design mission profile 806 for Mission 2 that results in a DM of 0.77. If the outlier threshold is set to a value that is 0.65 or lower, the field mission profile 802 will be classified as an outlier.

The output of the comparison performed at 306 is the statistical breakdown of the field data compared to expected statistics from the design requirements. Table 1 shows an example, whereby the field missions of the test population were classified according to a similarity with 4 design missions

TABLE 1

| Design Mission 1 | Design Mission 2 | Design Mission 3 | Design Mission 4 |
|---|---|---|---|
| 10% | 50% | 20% | 20% |

The output of the comparison may also be provided with more granularity, as shown in the example of Table 2 where the missions are also grouped by aircraft tail number, and there are two design missions to compare the field missions to.

TABLE 2

| Tail Number | Total | Design Mission 1 | Design Mission 2 |
|---|---|---|---|
| EN-ABC-123 | 100 | 60% | 40% |
| EN-ACD-123 | 200 | 80% | 20% |
| EN-EBC-123 | 300 | 71% | 29% |
| EN-NCQ-123 | 400 | 75% | 25% |
| Total Fleet | 1000 | 73.3% | 26.7% |

In some embodiments, the output of the time-series comparison at 306 also includes statistics with respect to the outliers. In some embodiments, a given number of detected outliers may trigger an alert signal to indicate a large dataset of outliers.

Referring back to FIG. 3, once the field statistics are obtained, they may be compared to expected statistics from the design requirements at 308. A compliance assessment of the test population is then output based on a difference between the field statistics and the expected statistics. An example is shown in Table 3.

TABLE 3

| | Design Mission 1 | Design Mission 2 | Design Mission 3 | Design Mission 4 |
|---|---|---|---|---|
| Actual Use | 10% | 50% | 20% | 20% |
| Expected Use | 15% | 45% | 5% | 35% |
| Difference | 5% | 5% | 15% | 15% |

A compliance threshold may be set for the difference between the actual use (i.e. field data) and the expected use (i.e. design requirements). For example, if the difference for any given mission is greater than 10%, then the output would indicate that the test population is non-compliant. Alternatively, if the average difference for the totality of the missions is greater than 10%, then the output would indicate that the test population is non-compliant. Various embodiments may be used for setting the compliance threshold to identify a test population as either compliant or non-compliant with respect to the design requirements.

In some embodiments, a confidence level is associated with the output of compliant/non-compliant. For example, this may be done by performing a hypothesis test. The hypothesis being tested is that the test population selected is suitably representative for the purposes of the compliance analysis. An example is shown in Table 4 below.

TABLE 4

| Tail Number | Total | Design Mission 1 | Design Mission 2 | RejH0 | P-value |
|---|---|---|---|---|---|
| EN-ABC-123 | 100 | 60% | 40% | 1 | 0.01 |
| EN-ACD-123 | 200 | 80% | 20% | 1 | 0.01 |
| EN-EBC-123 | 300 | 71% | 29% | 0 | 0.13 |
| EN-NCQ-123 | 400 | 75% | 25% | 1 | 0.04 |

For the statistical hypothesis testing, H0 is true (i.e. =1) when the field data is compliant with the design requirements, H1 is true when the field data is not compliant with the design requirements. RejH0 is true when the null hypothesis H0 is rejected (i.e. =0) at a given significant level (for example 5%). The P-value is the probability of finding the observed results when the null hypothesis H0 is true. If the P-value is less than the given significant level, H0 is rejected, which indicates that field data is not compliant with the design requirements.

Figure 9:
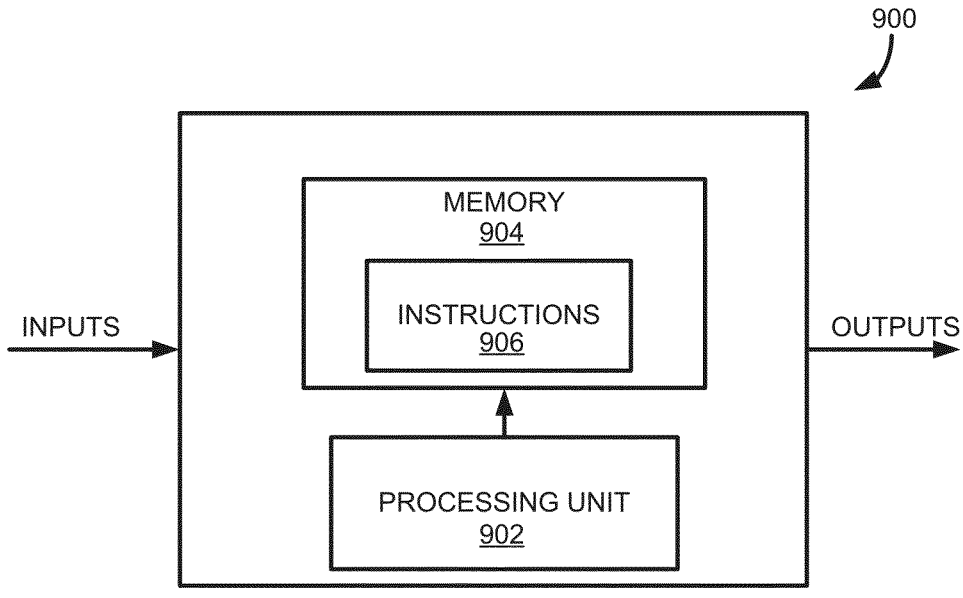
FIG. 9 is a block diagram of an example computing device.

The compliance assessment system 204 may be implemented with one or more computing device. With reference to FIG. 9, an example of a computing device 900 is illustrated. For simplicity only one computing device 900 is shown but the system 204 may include more computing devices 900 operable to exchange data directly and/or through one or more network. The computing devices 900 may be the same or different types of devices. Note that the system 204 is not limited to off-board applications for fleet-level analysis. The system 204 can also be used for edge analytics applications such as on-board engine status monitoring, including online anomaly detection to enable life extending control. As such, the system 204 can be implemented as part of a full-authority digital engine controls (FADEC) or other similar device, including electronic engine control (EEC), engine control unit (ECU), electronic propeller control, propeller control unit, and the like. In some embodiments, the system 204 is implemented as a Flight Data Acquisition Storage and Transmission system, such as a FAST™ system. The system 204 may be implemented in part in the FAST™ system and in part in the EEC. Other embodiments may also apply.

The computing device 900 comprises a processing unit 902 and a memory 904 which has stored therein computer-executable instructions 906. The processing unit 902 may comprise any suitable devices configured to implement a method such that instructions 906, when executed by the computing device 900 or other programmable apparatus, may cause the functions/acts/steps performed as part of the method to be executed. The processing unit 902 may comprise, for example, any type of general-purpose micropro-cessor or microcontroller, a digital signal processing (DSP) processor, a central processing unit (CPU), an integrated circuit, a field programmable gate array (FPGA), a recon-figurable processor, other suitably programmed or program-mable logic circuits, or any combination thereof.

The memory 904 may comprise any suitable known or other machine-readable storage medium. The memory 904 may comprise non-transitory computer readable storage medium, for example, but not limited to, an electronic, magnetic, optical, electromagnetic, infrared, or semiconduc-tor system, apparatus, or device, or any suitable combination of the foregoing. The memory 904 may include a suitable combination of any type of computer memory that is located either internally or externally to device, for example ran-dom-access memory (RAM), read-only memory (ROM), compact disc read-only memory (CDROM), electro-optical memory, magneto-optical memory, erasable programmable read-only memory (EPROM), and electrically-erasable pro-grammable read-only memory (EEPROM), Ferroelectric RAM (FRAM) or the like. Memory 904 may comprise any storage means (e.g., devices) suitable for retrievably storing machine-readable instructions 906 executable by processing unit 902.

Figure 10:
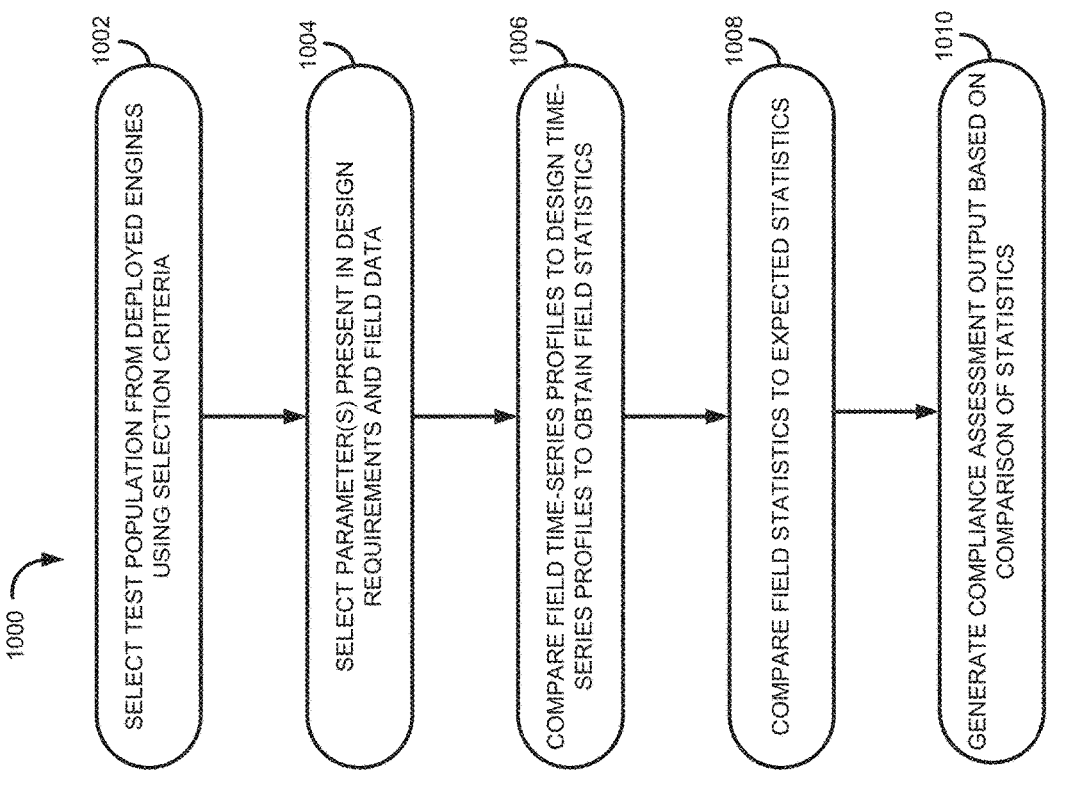
FIG. 10 is a flowchart of an example method for compliance analysis of aircraft engines.

An example method 1000 for assessing compliance of aircraft engines, as embodied by part or all of the instruc-tions 906, is illustrated in FIG. 10. At step 1002, a test population is selected from a set of deployed aircraft engines based on one or more selection criteria. Each of the deployed aircraft engines has associated thereto design requirements and field data. This selection may be performed using a digital thread platform, enabled by a knowledge graph (KG) and semantic linking, and by making available data related to design, manufacturing, product serial number, MRO, operational data, test data, engineering models and require-ments, and the like.

At step 1004, at least one parameter is selected for the test population of the deployed engines, the selected parameter (s) being present in both the design requirements and the field data of the test population. This step may comprise automatic extraction, decomposition and modeling of the design requirements of the anticipated behavior of the aircraft engine in the field. These design requirements are usually negotiated by customers or operators early in the product development process. The various modeled versions of design requirements, evolution of product configurations and field data of the test population are semantically linked. The selected operational missions may be automatically connected to valid requirements and corresponding models through an ontology. User-tunable weights may be used to weigh different flight parameters differently, for example through an active learning framework.

At step 1006, field time-series profiles are compared to design time-series profiles using a similarity metric to obtain field data statistics. The field data is analyzed using an appropriate similarity model to extract statistics from the missions of the test population. A suitable similarity model may be selected from a plurality of available similarity models, depending on the type of requirement. For example, a machine learning-based clustering technique can be applied with any time series metric for temporal similarity in mission profiles. Outliers in the field data can also be detected using anomaly detection methods, and character-ized to support more in-depth analysis.

At step 1008, the field statistics are compared to expected statistics from the design requirements. The expected sta-tistics prescribed as part of the design requirements and the statistics observed in the test population field data are compared using an appropriate framework, such as statisti-cal hypothesis testing or another framework. As with simi-larity modeling, different choices are available for the hypothesis tests. For example, mission utilisation described as percent composition can be compared to expected com-position using a Pearson test, while Wald's test can be used to determine if the computed statistics lie within a range prescribed by the requirement. At step 1010, a compliance assessment output based on the comparison performed at step 1008 is generated. The output yields insight as to whether compliance is met or not, in some cases with a user prescribed confidence level.

The method 1000 may be applied to a fleet as well as any specific individual serialized aircraft engine. Selection cri-teria such as product model, time period, geographical region of operation, operation/customer demographics, etc., are used as input to define the population of field data for which compliance analysis needs to be performed. In some embodiments, dynamic time warping semantically links the selected population parameters to the relevant version of the design requirements using computational ontology, and automatically models the requirements for the compliance analysis. During the compliance analysis, relevant similarity modeling frameworks are selected to compute relevant statistics from the field data and compare the relevant statistics to expected statistics as specified in requirements.

In some embodiments, the methods and systems for compliance analysis described herein relate to using ontol-ogy-based selected population field data in the context of fleet management applications. In some embodiments, the methods and system for compliance analysis comprise a statistical approach for automatically analyzing compliance using field data, and encompasses a large class/type of requirements for aerospace applications.

The methods and systems for compliance analysis described herein may be implemented in a high level procedural or object oriented programming or scripting language, or a combination thereof, to communicate with or assist in the operation of a computer system, for example the computing device 900. Alternatively, the methods and systems for compliance analysis may be implemented in assembly or machine language. The language may be a compiled or interpreted language. Program code for implementing the methods and systems for compliance analysis may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for compliance analysis may also be considered to be implemented by way of a non-transitory computer-readable storage medium having a computer program stored thereon. The computer program may comprise computer-readable instructions which cause a computer, or more specifically the processing unit 902 of the computing device 900, to operate in a specific and predefined manner to perform the functions described herein, for example those described in the method 400.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, the outcome of the compliance analysis may be presented to the user in different forms, ranging from high level outcomes as to whether the selected test population of any individual in the population is compliant or not, to more detailed understanding of sources of non-compliance, visualization and reasoning to support the analysis and decision-making. Furthermore, data labeling burdens may be minimized by automatically selecting and presenting to a user certain similarity analyses in order to resolve classification ambiguity through user-tunable weights. Yet further modifications could be implemented by a person of ordinary skill in the art in view of the present disclosure, which modifications would be within the scope of the present technology.

The invention claimed is:

1. A method of monitoring a set of deployed aircraft engines based on a deviation in actual utilization of the set of deployed aircraft engines from an expected utilization of the set of deployed aircraft engines, the method comprising:

operating the set of deployed aircraft engines to propel aircraft during flight events, wherein onboard electronic engine controls are respectively associated with each deployed aircraft engine in the set of deployed aircraft engines;

using the onboard electronic engine controls respectively associated with each deployed aircraft engine in the set of deployed aircraft engines to acquire field data associated with the set of deployed aircraft engines during operation of the set of deployed aircraft engines, the field data including at least one parameter indicating the actual utilization of the set of deployed aircraft engines during the flight events, acquiring field data including:

performing on-board status monitoring of the set of deployed aircraft engines during the flight events using the electronic engine controls respectively associated with each deployed aircraft engine in the set of deployed aircraft engines; and storing the field data into one or more databases storing digital data; establishing a digital communication connection to the one or more databases storing the digital data for the set of deployed aircraft engines, by a computing device via a network, wherein the computing device comprises at least one processor communicatively coupled to a memory device;

using the digital communication connection to access the digital data for the set of deployed aircraft engines, by the at least one processor via the network;

selecting, from the digital data, a test population from the set of deployed aircraft engines based on one or more selection criteria, by the at least one processor, each deployed aircraft engine of the set of deployed aircraft engines having associated thereto design requirements indicative of the expected utilization of the set of deployed aircraft engines, and field data;

selecting the at least one parameter that is present in both the design requirements and the field data of the test population, by the at least one processor, the design requirements comprising design time-series profiles, the field data comprising field time-series profiles;

comparing by the at least one processor, the field time-series profiles to the design time-series profiles for the at least one parameter using a similarity metric to obtain field statistics;

comparing the field statistics to expected statistics from the design requirements by the at least one processor;

generating a compliance assessment output of the test population based on a difference between the field statistics and the expected statistics, by the at least one processor; and causing a display device to present a table indicating the difference between the field statistics and the expected statistics.

2. The method of claim 1, wherein the similarity metric is a distance between the field time-series profiles and the design time-series profiles.

3. The method of claim 2, wherein the comparing of the field time-series profiles to the design time-series profiles comprises performing dynamic time warping.

4. The method of claim 1, wherein the comparing of the field statistics to the expected statistics comprises performing a statistical hypothesis test.

5. The method of claim 1, wherein the generating of the compliance assessment output comprises including a confidence level.

6. The method of claim 1, wherein the selecting of the at least one parameter comprises normalizing the at least one parameter, and the comparing of the field time-series profiles to the design time-series profiles comprises comparing the at least one parameter as normalized.

7. The method of claim 1, wherein the selecting of the at least one parameter comprises applying weights to the at least one parameter, and the comparing of the field time-series profiles to the design time-series profile comprises comparing the at least one parameter as weighted.

8. The method of claim 7, wherein the weights are tunable through sample selection active learning.

9. The method of claim 1, wherein:

the comparing of the field time-series profiles to the design time-series profiles comprises detecting outliers in the field time-series profiles using a similarity metric threshold; and the method includes triggering an alert signal to indicate a dataset of the outliers.

10. The method of claim 1, wherein the design requirements comprise design missions and an expected utilisation of each of the design missions.

11. The method of claim 1, comprising causing a change in engine pressure and/or engine temperature in the deployed aircraft engines during the flight events, the at least one parameter including the engine pressure and/or the engine temperature.

12. A system for monitoring a set of deployed aircraft engines, the system comprising:

onboard electronic engine controls respectively associated with each deployed aircraft engine in the set of deployed aircraft engines, the onboard electronic engine controls being operable to perform on-board status monitoring of the deployed aircraft engines during flight events and acquire field data associated with the set of deployed aircraft engines during operation of the set of deployed aircraft engines, the field data including at least one parameter indicative of an actual utilization of the set of deployed aircraft engines during the flight events;

an off-board display device external to aircraft associated with the set of deployed aircraft engines, wherein the off-board display device presents output data to a user; and an off-board computing device external to aircraft associated with the set of deployed aircraft engines, wherein the off-board computing device performs off-board fleet-level analysis, the off-board computing device including:

a memory device configured to receive and store the field data into one or more databases storing digital data; and at least one processor communicatively coupled to the memory device and the display device, the at least one processor:

establish a communication connection to the one or more databases storing digital data for the set of deployed aircraft engines;

use the communication connection to access the digital data for the set of deployed aircraft engines;

select, from the digital data, a test population from the set of deployed aircraft engines based on one or more selection criteria, each deployed aircraft engine of the set of deployed aircraft engines having associated thereto design requirements and field data;

select the at least one parameter that is present in both the design requirements and the field data of the test population, the design requirements comprising design time-series profiles, the field data comprising field time-series profiles;

compare the field time-series profiles to the design time-series profiles for the at least one parameter using a similarity metric to obtain field statistics;

compare the field statistics to expected statistics from the design requirements;

generate a compliance assessment output of the test population based on a difference between the field statistics and the expected statistics; and cause the display device to present a table indicating the difference between the field statistics and the expected statistics.

13. The system of claim 12, wherein the similarity metric is a distance between the field time-series profiles and the design time-series profiles.

14. The system of claim 12, wherein the comparing of the field time-series profiles to the design time-series profiles comprises performing dynamic time warping.

15. The system of claim 12, wherein the comparing of the field statistics to the expected statistics comprises performing a statistical hypothesis test.

16. The system of claim 12, wherein the generating of the compliance assessment output comprises including a confidence level.

17. The system of claim 12, wherein the selecting of the at least one parameter comprises normalizing the at least one parameter, and the comparing of the field time-series profiles to the design time-series profiles comprises comparing the at least one parameter as normalized.

* * * * *